US011841607B2

(12) United States Patent
Saito et al.

(10) Patent No.: US 11,841,607 B2
(45) Date of Patent: Dec. 12, 2023

(54) ACCESSORY DEVICE CAPABLE OF BEING ATTACHED TO OR DETACHED FROM ELECTRONIC APPARATUS

(71) Applicant: CANON KABUSHIKI KAISHA, Tokyo (JP)

(72) Inventors: Keiichiro Saito, Tokyo (JP); Yoshinobu Okano, Saitama (JP); Takayuki Shu, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 71 days.

(21) Appl. No.: 17/530,819

(22) Filed: Nov. 19, 2021

(65) Prior Publication Data
US 2022/0163875 A1     May 26, 2022

(30) Foreign Application Priority Data
Nov. 25, 2020   (JP) ................................ 2020-195525

(51) Int. Cl.
*G03B 17/56*   (2021.01)
(52) U.S. Cl.
CPC ................................ *G03B 17/566* (2013.01)
(58) Field of Classification Search
CPC ............................... G03B 17/56; G03B 17/566
See application file for complete search history.

(56) References Cited

U.S. PATENT DOCUMENTS

| 10,620,510 B2 | 4/2020 | Tamura et al. |
| 2008/0170843 A1 | 7/2008 | Yamashita |
| 2013/0223831 A1 | 8/2013 | Miyakawa et al. |
| 2018/0352139 A1* | 12/2018 | Sugita .................. H04N 23/663 |

FOREIGN PATENT DOCUMENTS

JP     5838372 B2     1/2016

OTHER PUBLICATIONS

European Search Report dated Apr. 21, 2022, which is enclosed, that issued in the corresponding European Patent Application No. 21208685.4.

* cited by examiner

*Primary Examiner* — Clayton E. LaBalle
*Assistant Examiner* — Fang-Chi Chang
(74) *Attorney, Agent, or Firm* — Cowan, Liebowitz & Latman, P.C.

(57) ABSTRACT

An accessory device capable of preventing setting information to be written from being destroyed is provided. The accessory device capable of being attached to or detached from an electronic apparatus, comprising an operation member, a lock mechanism configured to perform a locking operation to lock the accessory device and the electronic apparatus in response to an operation of the operation member, a movement restriction release mechanism configured to release a restriction on a movement of the operation member, and an operation restricting member configured to restrict an operation of the movement restriction release mechanism. The operation restricting member makes it more difficult to perform the operation of the movement restriction release mechanism when a power of the accessory device is in an on state than when the power of the accessory device is in an off state.

12 Claims, 14 Drawing Sheets

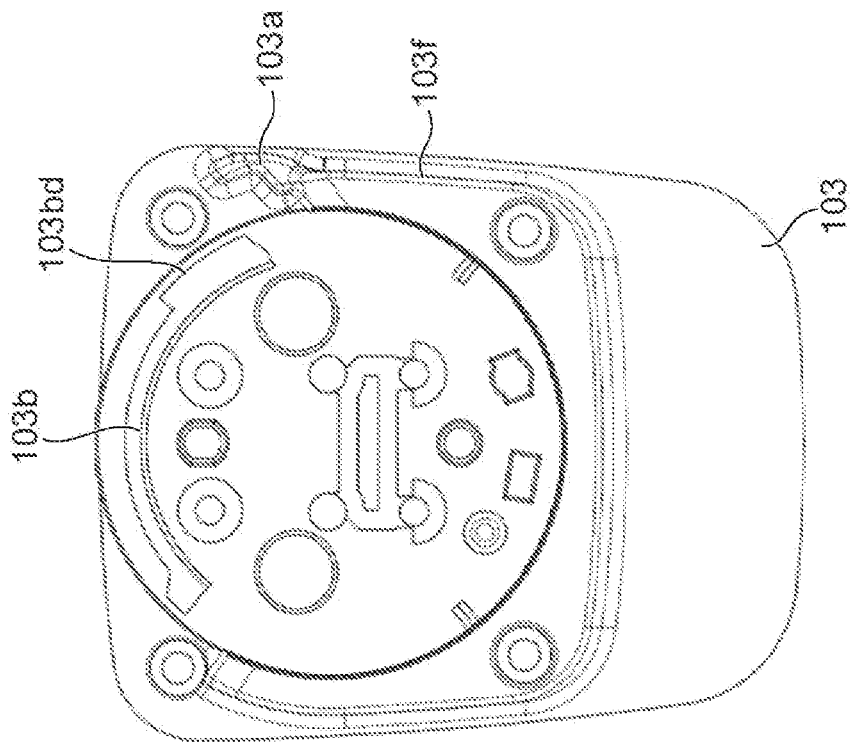
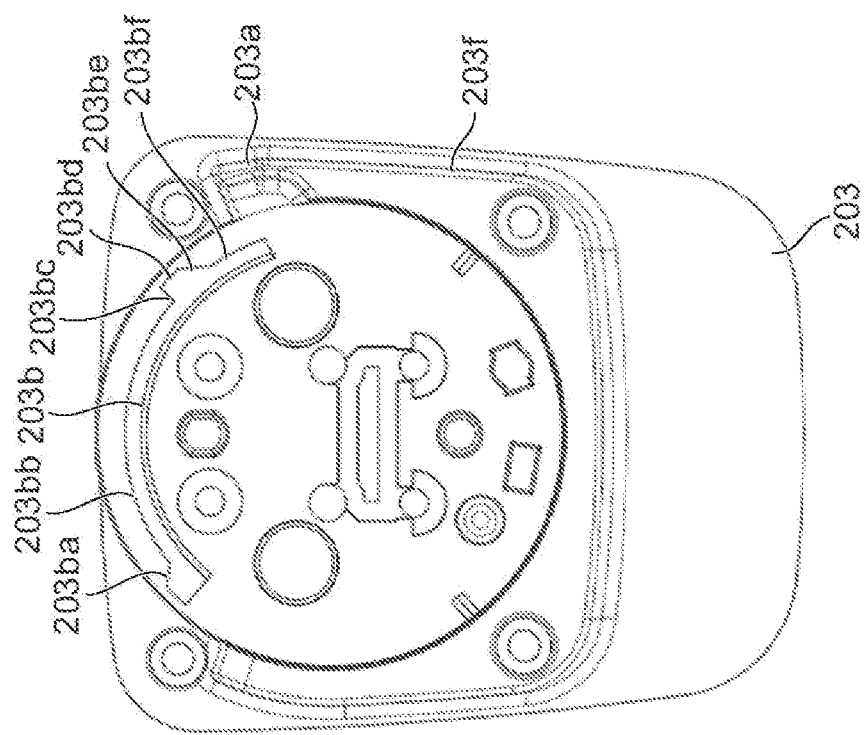
FIG. 12A
FIG. 12B

ACCESSORY DEVICE CAPABLE OF BEING ATTACHED TO OR DETACHED FROM ELECTRONIC APPARATUS

BACKGROUND OF THE INVENTION

Field of the Invention

The present invention relates to an accessory device attached to an electronic apparatus.

Description of the Related Art

An accessory device, which is capable of being attached to or detached from an accessory shoe of an image pickup apparatus (for example, a camera) that is an electronic apparatus, has a lock mechanism that prevents the accessory device from dropping from the image pickup apparatus and a power switch, but conventionally, the lock mechanism and the power switch are independently disposed. For example, Japanese Patent No. 5838372 discloses a technique, in which a function of the power switch is not added to a fixing ring 17 that is the lock mechanism of a strobe device 1 as the accessory device, and the fixing ring 17 and the power switch are independently disposed.

Further, in recent years, in the accessory device, in the case of a power-on state or when shifting from the power-on state to a power-off state by operating the power switch, setting information from the image pickup apparatus is written into a memory such as an EEPROM (Electrically Erasable Programmable Read-Only Memory).

However, in the case that the power is in the power-on state and the setting information is being written into the memory such as the EEPROM, if the accessory device is detached from the image pickup apparatus, there is a risk that the setting information will be destroyed.

Further, in a configuration that the power is supplied from the image pickup apparatus to the accessory device, if the power supply from the image pickup apparatus to the accessory device is stopped during the setting information is being written into the memory such as the EEPROM, there is also a risk that the setting information will be destroyed.

SUMMARY OF THE INVENTION

The present invention provides an accessory device capable of preventing setting information to be written from being destroyed.

Accordingly, the present invention provides an accessory device capable of being attached to or detached from an electronic apparatus, comprising an operation member, a lock mechanism configured to perform a locking operation to lock the accessory device and the electronic apparatus in response to an operation of the operation member, a movement restriction release mechanism configured to release a restriction on a movement of the operation member, and an operation restricting member configured to restrict an operation of the movement restriction release mechanism, and wherein the operation restricting member makes it more difficult to perform the operation of the movement restriction release mechanism when a power of the accessory device is in an on state than when the power of the accessory device is in an off state.

According to the present invention, it is possible to prevent the setting information to be written into a memory or the like of the accessory device from being destroyed.

Further features of the present invention will become apparent from the following description of exemplary embodiments with reference to the attached drawings.

BRIEF DESCRIPTION OF THE DRAWINGS

FIGS. 12A and 12B are views for explaining a lock release button sliding cam portion formed on a bottom cover in the second embodiment of the present invention.

DESCRIPTION OF THE EMBODIMENTS

The present invention will now be described in detail below with reference to the accompanying drawings showing embodiments thereof.

At first, a first embodiment of the present invention will be described.

Figure 1A:
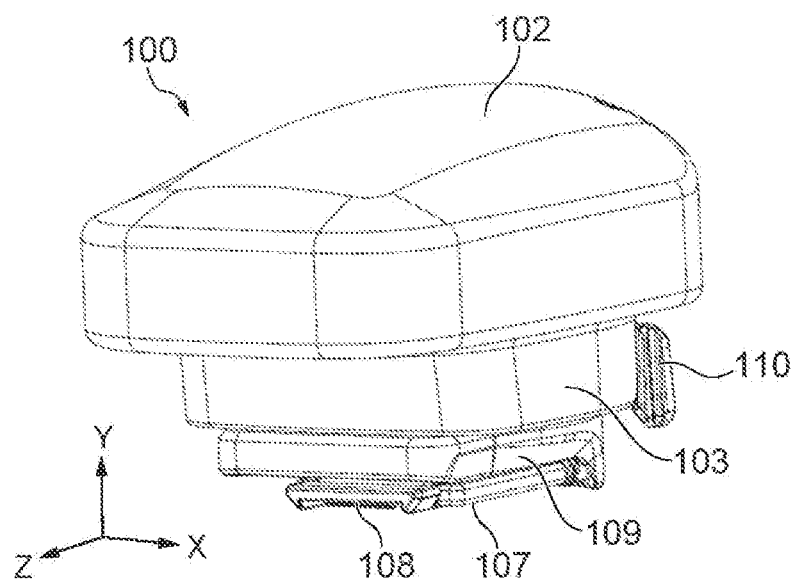
FIGS. 1A and 1B are views that show the outside appearance of a transmitter as an accessory device according to a first embodiment of the present invention.
Figure 1B:
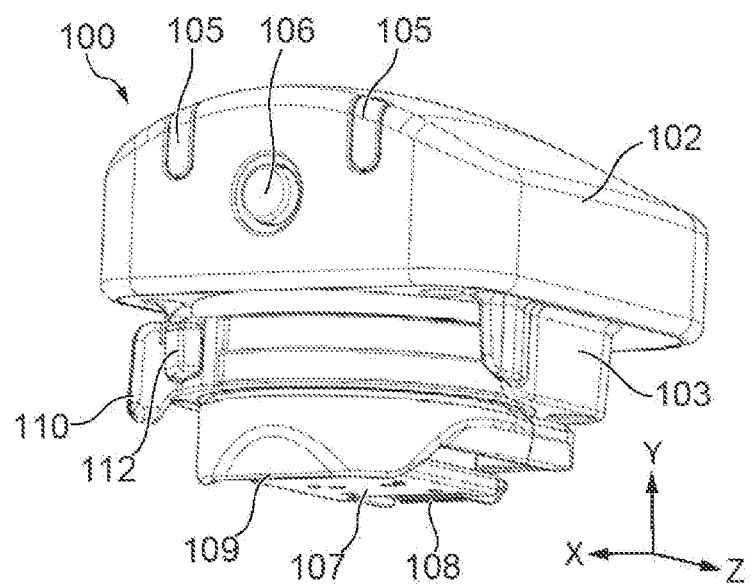
Figure 2A:
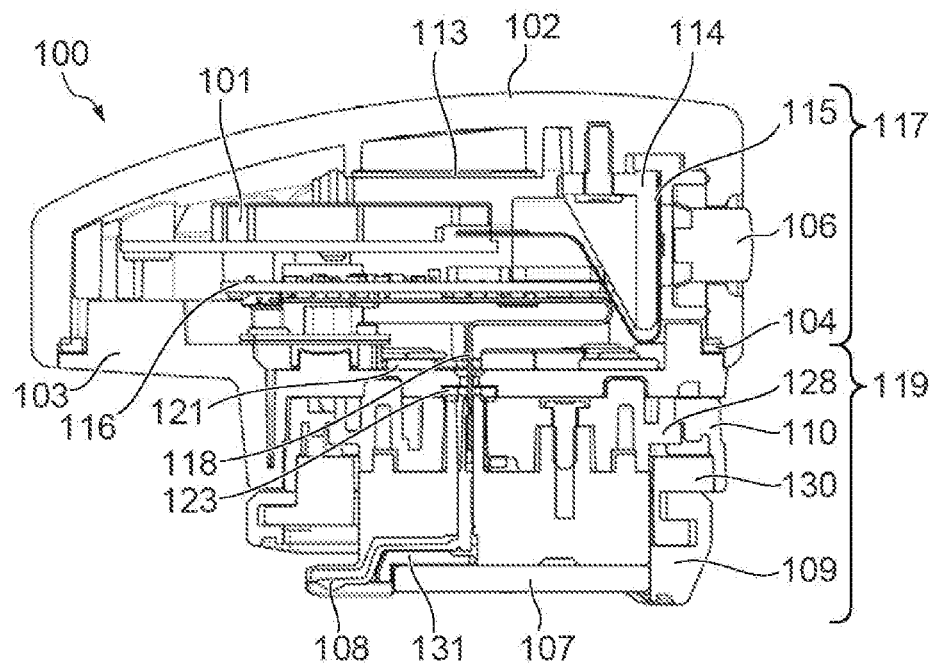
FIG. 2A is a sectional view that shows the internal structure of the transmitter of FIG. 1A.
Figure 2B:
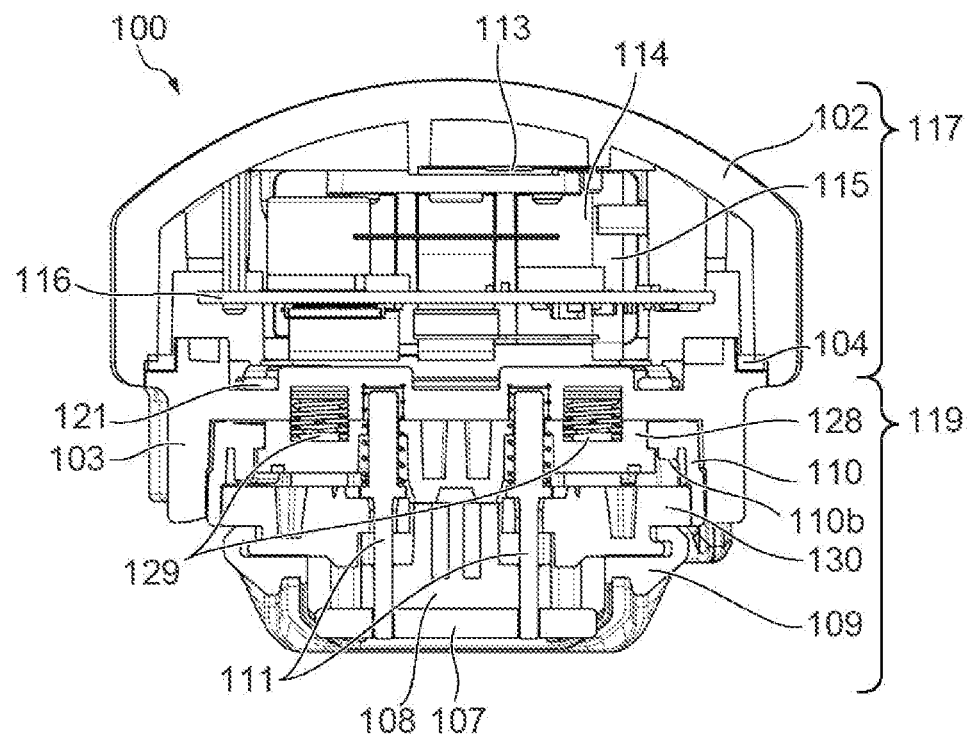
FIG. 2B is a sectional view that shows the internal structure of the transmitter of FIG. 1B.
Figure 3:
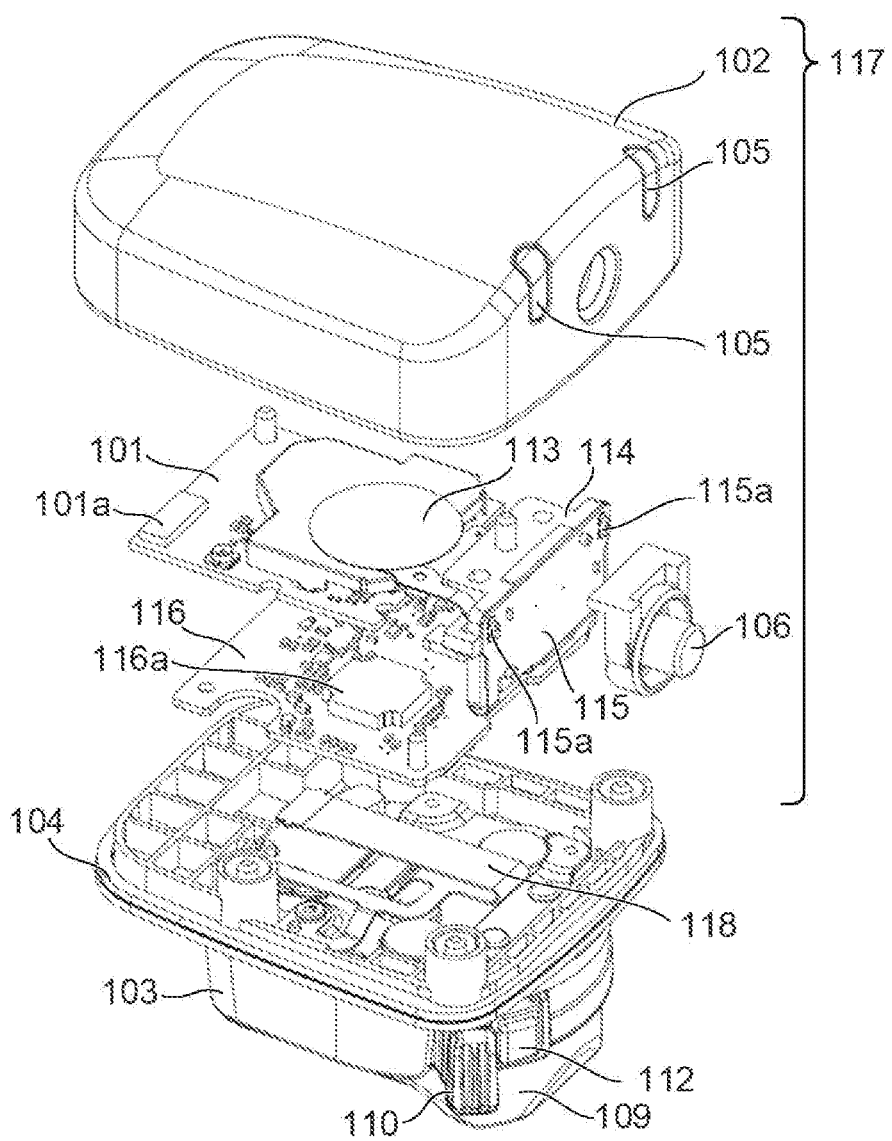
FIG. 3 is an exploded perspective view of the transmitter in the case that a top cover is detached from a bottom cover.
Figure 4A:
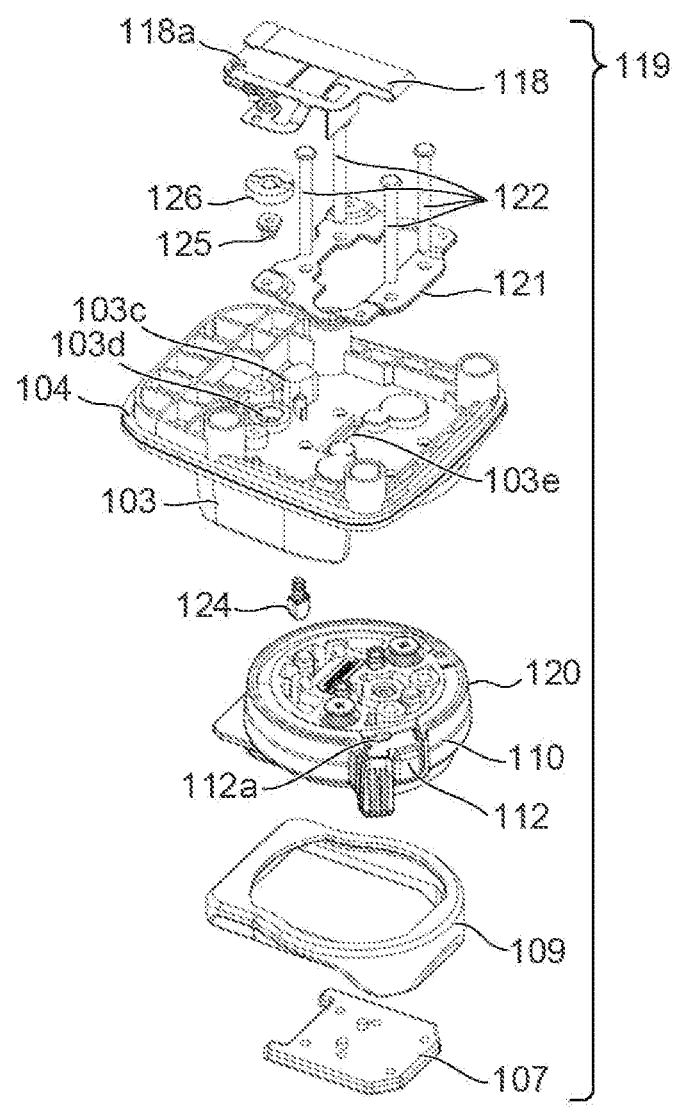
FIGS. 4A and 4B are perspective views for explaining the internal structure of a bottom case unit in the transmitter of FIGS. 1A and 1B.
Figure 4B:
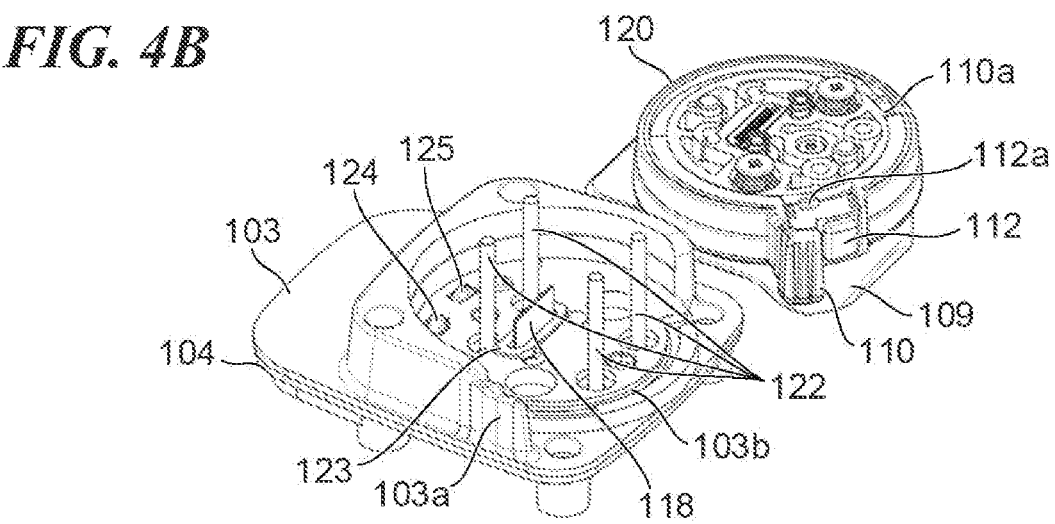

FIGS. 1A and 1B are views that show the outside appearance of a transmitter 100 as an accessory device according to the first embodiment of the present invention. FIG. 1A shows a case that the transmitter 100 is viewed from an oblique front, and FIG. 1B shows a case that the transmitter 100 is viewed from an oblique rear. FIG. 2A is a sectional view that shows the internal structure of the transmitter 100 of FIG. 1A, and FIG. 2B is a sectional view that shows the internal structure of the transmitter 100 of FIG. 1B. FIG. 2A is the cross-sectional view along a YZ plane in FIGS. 1A and 1B, and FIG. 2B is the cross-sectional view along a XY plane in FIGS. 1A and 1B. FIG. 3 is an exploded perspective view of the transmitter 100 in the case that a top cover 102 is detached from a bottom cover 103. FIGS. 4A and 4B are perspective views for explaining the internal structure of a bottom case unit 119 in the transmitter 100 of FIGS. 1A and 1B. FIG. 4A is the exploded perspective view of the bottom case unit 119, and FIG. 4B is the view for explaining a mating surface of the bottom cover 103 mated with the lock unit 120. Further, in FIG. 4B, the bottom cover 103 is shown so that the top and bottom are reversed with respect to the lock unit 120.

The transmitter 100 has a wireless module 101, performs wireless communications with a strobe device (not shown) that also has a wireless module, and transmits a light emission instruction to the strobe device. Further, the transmitter 100 according to the present embodiment works by means of a bus power supply method that receives supply of a power from a camera (not shown) that is an electronic apparatus. Moreover, the transmitter 100 may be configured to be equipped with a power source such as a battery and work by means of a self-power method.

The transmitter 100 is roughly divided into a top case unit 117 and the bottom case unit 119. In the top case unit 117, the top cover 102 covers the internal structure, and in the bottom case unit 119, the bottom cover 103 covers the internal structure. A cushion member 104 is inserted into a mating portion of the top cover 102 and the bottom cover 103 (i.e., is sandwiched between the top cover 102 and the bottom cover 103) so as to prevent liquid droplets from entering the inside of the transmitter 100.

LED (Light Emitting Diode) notification windows 105 and an operation button 106 are disposed on the top cover 102. The LED notification windows 105 are welded to the top cover 102 to have the drip-proof performance, and notify various states of the transmitter 100 as light projecting windows of LEDs 115*a* inside. The operation button 106 is composed of a rubber member, and is in close contact with the top cover 102 to exhibit the drip-proof performance. The operation button 106 is a button that is used when performing various settings of the transmitter 100, and a MPU (Micro-Processing Unit) 116*a*, which will be described later, changes the various settings of the transmitter 100 according to user's operations performed with respect to the operation button 106.

A plate 107, which is a connection portion for mounting on an accessory shoe of the camera, lock pins 111, and a contact plug 108 (a mounting portion), are disposed on the bottom cover 103, and a boot 109 is mounted so as to cover the plate 107, the lock pins 111, and the contact plug 108. The contact plug 108 receives various communications and the supply of the power via a contact portion of the accessory shoe of the camera.

Further, the lock unit 120 (a lock mechanism) is incorporated in the bottom cover 103, and the lock unit 120 has a lever 110 (an operation member) capable of rotating around a Y axis. In the transmitter 100, an operator rotates the lever 110 to a lock position, so that the lock pins 111 provided inside of the plate 107 pop out of the plate 107, i.e., the lock pins 111 provided the inside of the plate 107 protrude to outside (downward) of the plate 107. The lock pins 111, which popped out, fit into a hole portion that is provided in the accessory shoe of the camera, restrict the movement of the transmitter 100 in an attachment/detachment direction, and shift the transmitter 100 to a locked state, in which the transmitter 100 cannot be detached from the camera. In this way, it is possible to prevent the transmitter 100 from dropping from the camera.

The lever 110 has a lock release button 112 (a movement restriction release mechanism). When the lock release button 112 is operated (for example, is pressed down), the lever 110 can rotate from the lock position in a direction opposite to a rotating direction when shifting to the locked state. Hereinafter, the rotating direction when shifting to the locked state is referred to as "a lock direction" or "a predetermined direction". Further, the direction opposite to the rotating direction when shifting to the locked state is referred to as "a unlock direction" or "a direction opposite to the predetermined direction". Then, when the lever 110 is rotated in the unlock direction and reaches an unlock position, the lock pins 111, which popped out, are housed in the inside of the plate 107, and the transmitter 100 shifts to an unlocked state, in which the transmitter 100 can be detached from the camera.

The lever 110 is configured to be rotatable further from the lock position in the lock direction. When the lever 110 is further rotated from the lock position in the lock direction and reaches a power-on position, a power of the transmitter 100 becomes an on state (i.e., the transmitter 100 becomes a power-on state). Further, by rotating the lever 110 from the power-on position to a power-off position in the unlock direction, the power of the transmitter 100 becomes an off state (i.e., the transmitter 100 becomes a power-off state), that is, the transmitter 100 is not used (i.e., non-use of the transmitter 100). In other words, in the present embodiment, the function of a power switch is added to the lever 110. Moreover, in the present embodiment, it is assumed that the lock position and the power-off position accord.

The wireless module 101, a buzzer 113, a button base 114, a switch FPC (Flexible Printed Circuits) 115, the operation button 106, and a main substrate 116 are disposed within the interior of the top cover 102, and these configuration elements constitute the top case unit 117. The buzzer 113 is adhered to the top cover 102 and is electrically connected to the switch FPC 115. By means of a buzzer sound, the buzzer 113 notifies the various states of the transmitter 100 in the same manner as the LED notification windows 105. The button base 114 fixes the switch FPC 115 and receives a force that is generated when the operation button 106 is pressed. In the top case unit 117, by a wiring pattern of the switch FPC 115 and conductive rubber provided in the operation button 106 come into contact with each other, the operation button 106 functions as a push-button switch. The switch FPC 115 has the LEDs 115*a*, and electrically connects the wireless module 101 and the buzzer 113 to the main substrate 116. Further, an antenna 101*a* (a chip antenna) for the wireless communications is mounted on an upper end side of the wireless module 101. The MPU 116*a* (a control unit), which performs various controls, and various electric components including connectors, to which the switch FPC 115 and a shoe FPC 118 are connected, and the like are mounted on the main substrate 116.

The lock unit 120 is fixed by being sandwiched between the plate 107 and a GND (Ground) plate 121 by means of four screws 122. Further, these configuration elements constitute the bottom case unit 119. In the bottom cover 103, in addition to the cushion member 104 described above, a cushion member 123 is disposed at a boundary portion between a hole portion 103*e* where the shoe FPC 118 is inserted and the lock unit 120, and as a result, it is possible to suppress that the liquid droplets (for example, water droplets) enter the inside of the bottom cover 103. Moreover, the cushion member 104 and the cushion member 123 are adhered to the bottom cover 103 with a double-sided adhesive tape.

As shown in FIG. 4B, the bottom cover 103 has a click protrusion 124 and a power detecting protrusion 125 (a switching portion) on its mating surface mated with the lock unit 120. The click protrusion 124 and the power detecting protrusion 125 generate a click force when the lever 110 is rotated to switch between the power-on state and the power-off state, and perform a power detection. The click protrusion 124 is disposed in a protrusion housing portion 103c of the bottom cover 103, and is energized toward the lock unit 120 by a spring (not shown). When the lever 110 of the lock unit 120, which is incorporated into the interior of the bottom cover 103, rotates, the click protrusion 124 generates the click force by sliding with an opposing power cam portion 110a of the lever 110. The power detecting protrusion 125 is disposed in a power detecting hole 103d of the bottom cover 103, and is energized toward the lock unit 120 by a power detecting rubber member 126 (the switching portion). As with the click protrusion 124, when the lever 110 of the lock unit 120 rotates, the power detecting protrusion 125 also slides with the opposing power cam portion 110a of the lever 110.

In the bottom case unit 119, by conductive rubber provided in the power detecting rubber member 126 and a wiring pattern of the shoe FPC 118 come into contact with each other, the power detection is performed. The power detecting rubber member 126 also functions as a drip-proof member. Moreover, an operating force of the lever 110 can be adjusted by a force of the spring that energizes the click protrusion 124, an inclination angle of the power cam portion 110a, and a repulsive force of the power detecting rubber member 126.

The shoe FPC 118 is inserted into the hole portion 103e of the bottom cover 103, passes through the bottom cover 103, and is electrically connected to the contact plug 108. Further, the shoe FPC 118 has a reinforcing plate 118a, and is screwed to the bottom cover 103 so that an elastic force, which is generated when the power detecting rubber member 126 comes into contact with the wiring pattern of the shoe FPC 118, is received by the reinforcing plate 118a. Further, the shoe FPC 118 is also screwed to the GND plate 121, and electrically connects the plate 107, which is connected to the GND plate 121 via the screws 122, to GND of the contact plug 108.

Further, the bottom cover 103 has a power supply cover portion 103a (an operation restricting member, a cover member) and a lock release button sliding cam portion 103b. When the lever 110 is rotated to the power-on position in the lock direction, the power supply cover portion 103a covers at least a part of the lock release button 112, and hides it from the operator's finger or the like. As a result, it is possible to prevent such a phenomenon that in the case that the power is in the on state, if the lock release button 112 is accidentally pressed down, the lever 110 becomes capable of rotating in the unlock direction, and thus the lever 110 is unintentionally rotated to the unlock position. When the lever 110 is rotated from the power-on position to the power-off position, the power supply cover portion 103a exposes the lock release button 112. As a result, the lock release button 112 can be easily pressed down after shifting to the power-off state, and thus it is possible to smoothly shift to the unlocked state after shifting to the power-off state.

The lock release button sliding cam portion 103b is a cam structure that slides with a button protruding portion 112a of the lock release button 112 when the lever 110 rotates. The lock release button sliding cam portion 103b generates the click force when the lever 110 starts to rotate from the unlock position in the lock direction. Further, the button protruding portion 112a suppresses the rotation of the lever 110 and maintains the locked state by engaging with a wall portion of the lock release button sliding cam portion 103b when the lever 110 is located at the lock position (the power-off position).

Figure 5:
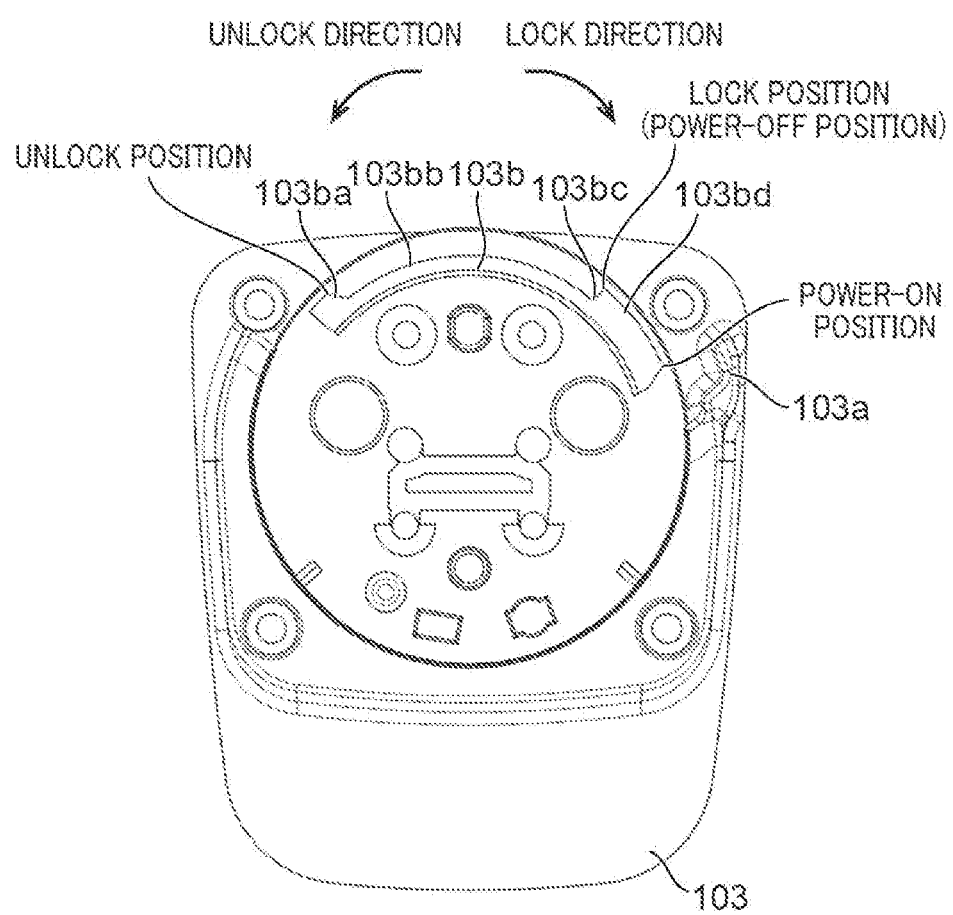
FIG. 5 is a view for explaining a lock release button sliding cam portion formed on the bottom cover.

FIG. 5 is a view for explaining the lock release button sliding cam portion 103b formed on the bottom cover 103. FIG. 5 shows a state, in which the bottom cover 103 is viewed from the camera side along a Y direction. With reference to FIG. 5, the movement of the lock release button 112 (the button protruding portion 112a) whose movement is restricted by the lock release button sliding cam portion 103b when the lever 110 rotates will be described. With respect to the lock direction, a cam slope 103ba, an arc wall surface 103bb, a lock wall surface 103bc, and a wall surface 103bd, which slide with the button protruding portion 112a, are formed on the lock release button sliding cam portion 103b in this order.

At first, when the lever 110 is operated to start rotating from the unlock position to the lock position, the button protruding portion 112a slides on the cam slope 103ba, and a click feeling is generated when the button protruding portion 112a moves toward a rotation center and gets over the cam slope 103ba. Next, along with the rotation toward the lock position of the lever 110, the button protruding portion 112a slides while being pressed against the arc wall surface 103bb by a lock release spring 127 described later. As a result, an appropriate operating feeling is given to the rotation of the lever 110.

After that, when the button protruding portion 112a gets over the lock wall surface 103bc of the lock release button sliding cam portion 103b that formed corresponding to the lock position, the button protruding portion 112a is pressed against the wall surface 103bd by the lock release spring 127. At this time, the transmitter 100 shifts to the locked state. Since the wall surface 103bd is formed at outside than the arc wall surface 103bb with respect to an energizing direction of the lock release spring 127, the lock wall surface 103bc becomes an obstacle, and the button protruding portion 112a, which is pressed against the wall surface 103bd, does not easily return to the arc wall surface 103bb. As a result, the locked state of the transmitter 100 is maintained. Moreover, at this time, the lever 110 is located at the power-off position.

Further, along with the rotation toward the lock direction of the lever 110, the button protruding portion 112a slides while being pressed against the wall surface 103bd, and the lever 110 eventually reaches the power-on position. Since a distance from the rotation center of the lever 110 to the wall surface 103b does not change with respect to the rotating direction, when the lever 110 rotates from the power-off position to the power-on position, the lock release button 112 does not move with respect to a radial direction of the rotation. Then, when the lever 110 reaches the power-on position, as described above, at least a part of the lock release button 112 is covered by the power supply cover portion 103a.

Figure 6:
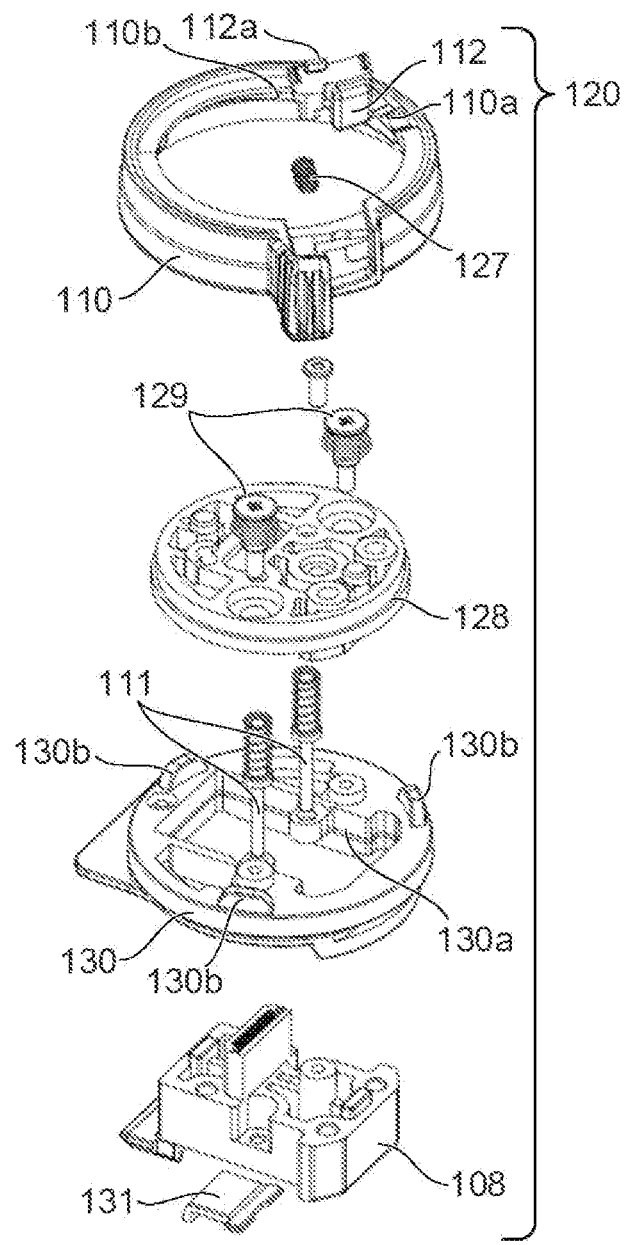
FIG. 6 is an exploded perspective view that shows the internal structure of a lock unit.
Figure 7A:
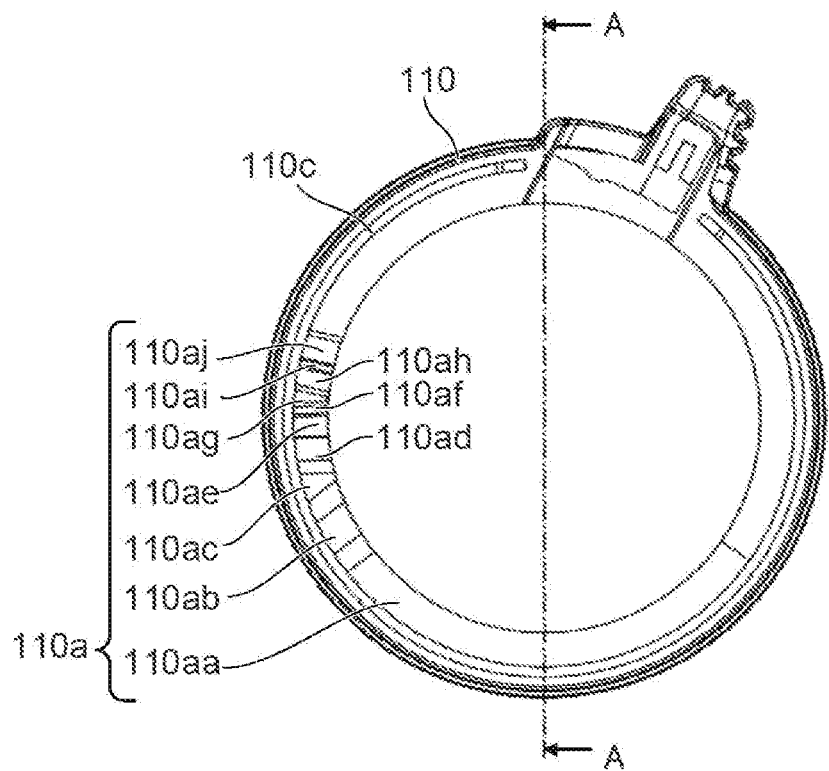
FIGS. 7A and 7B are views for explaining in detail a power cam portion and a shoe lock cam base sliding cam portion that are provided on a lever of the lock unit.
Figure 7B:
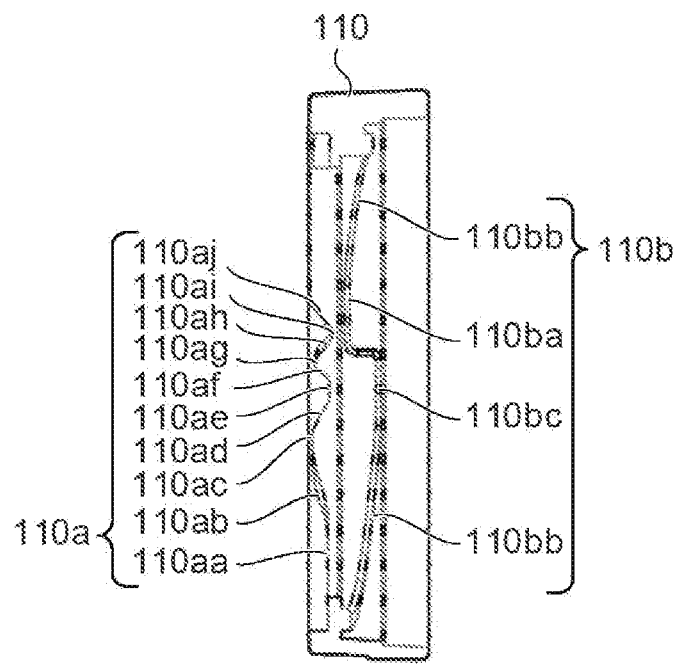

FIG. 6 is an exploded perspective view that shows an internal structure of the lock unit 120. FIGS. 7A and 7B are views for explaining in detail the power cam portion 110a and a shoe lock cam base sliding cam portion 110b that are provided on the lever 110 of the lock unit 120. FIG. 7A is a plan view of the lever 110, and FIG. 7B is a sectional view taken along line A-A of FIG. 7A. Moreover, it is noted that the click protrusion 124 and the power detecting protrusion 125 are not shown in FIGS. 7A and 7B.

As shown in FIG. 6, the lock unit 120 has the contact plug 108, the lever 110, a shoe top base 128, and a shoe lock base 130. The lock release button 112 is mounted on the lever 110, and the lock release button 112 is energized by the lock release spring 127 in an outward direction when being viewed from the rotation center. Further, the lock release button 112 rotates together with the lever 110. The shoe top base 128 is screwed to the shoe lock cam base 130 by two stepped screws 129 equipped with conical springs, and the conical springs of the stepped screws 129 energizes the shoe top base 128 toward the shoe lock cam base 130. The shoe top base 128 is in an approximately cylindrical shape, and the lever 110, which is in an approximately ring shape, is mounted on an outer peripheral side of the shoe top base 128. Further, the position of the shoe top base 128 is fixed with respect to the bottom cover 103, and the shoe top base 128 functions as a rotation axis of the lever 110. The lower part of the shoe lock cam base 130 abuts on the boot 109.

Further, the two lock pins 111 are disposed between the shoe top base 128 and the shoe lock cam base 130 so as to be energized toward the shoe lock cam base 130 by a compression spring on the basis of the shoe top base 128. A plug hole 130a is opened on the shoe lock cam base 130, the contact plug 108 is inserted into the plug hole 130a, and the contact plug 108 is screwed to the shoe top base 128. A contact spacer 131 is disposed on the contact plug 108, and the contact spacer 131 is insulated so that the plate 107 and a contact portion of the contact plug 108 does not come into contact with each other.

Further, the power cam portion 110a, which extends in the rotating direction, is formed on the upper surface of the lever 110, and the shoe lock cam base sliding cam portion 110b, which extends in the rotating direction, is formed on the lower surface of the lever 110. The power cam portion 110a is a cam, on which the click protrusion 124 and the power detecting protrusion 125 slide. Further, a sliding rib portion 110c is formed on the upper surface of the lever 110, and when the lever 110 rotates, the sliding rib portion 110c slides on the mating surface of the bottom cover 103 mated with the lock unit 120.

The shoe lock cam base sliding cam portion 110b is a cam, on which a protruding portion 130b of the shoe lock cam base 130 slides. In the present embodiment, although the shoe lock cam base 130 has three protruding portions 130b that are disposed on the circumference, three shoe lock cam base sliding cam portion 110b are provided on the lower surface of the lever 110 so as to correspond to each protruding portion 130b.

When the lever 110 rotates, the shoe lock cam base sliding cam portion 110b and the protruding portion 130b of the shoe lock cam base 130 slide. Then, in accordance with the outline (profile) of the shoe lock cam base sliding cam portion 110b, the shoe lock cam base 130 moves up and down (in the Y direction). Moreover, the sliding of the shoe lock cam base sliding cam portion 110b and the protruding portion 130b will be described in detail later.

As described above, the shoe top base 128 is connected to the shoe lock cam base 130 by the stepped screws 129, and the shoe lock cam base 130 abuts on the boot 109. Therefore, in accordance with a vertical movement of the shoe lock cam base 130, the lock pins 111, the stepped screws 129, and the boot 109 also move up and down. As a result, the accessory shoe of the camera is sandwiched between the boot 109 and the plate 107, and the lock pins 111, which popped out of the plate 107, fit into the hole portion of the accessory shoe of the camera. As a result, the transmitter 100 shifts from the unlocked state to the locked state.

Next, the details of sliding between the click protrusion 124 and the power cam portion 110a and sliding between the power detecting protrusion 125 and the power cam portion 110a will be described. When the transmitter 100 is in the unlocked state, both the click protrusion 124 and the power detecting protrusion 125 are located on a bottom surface 110aa of the power cam portion 110a. After that, when the lever 110 rotates in the lock direction, at first, the click protrusion 124 climbs a slope 110ab. After that, the click protrusion 124 gets over a top surface 110ac and goes down a slope 110ad, and when the click protrusion 124 reaches a bottom surface 110ae, the power detecting protrusion 125 starts to climb the slope 110ab. Further, when the click protrusion 124 has reached the bottom surface 110ae, the transmitter 100 shifts to the locked state (the power-off state). Furthermore, when the lever 110 continues to rotate in the lock direction, the click protrusion 124 climbs a slope 110af, gets over a top surface 110ag, goes down a slope 110ah, and reaches a bottom surface 110ai to generate the click force. When the click protrusion 124 reaches the bottom surface 110ai, the power detecting protrusion 125 reaches the top surface 110ac, and pushes the power detecting rubber member 126 to perform the power detection. At this time, the transmitter 100 shifts to the power-on state.

Furthermore, after the click protrusion 124 has reached the bottom surface 110ai, the lever 110 rotates in the unlock direction, so that the transmitter 100 shifts from the power-on state to the power-off state (the locked state) and further shifts to the unlocked state. In the present embodiment, even in the case that the click protrusion 124 reaches the bottom surface 110ai, the click protrusion 124 does not come in contact with the bottom surface 110ai. In the power cam portion 110a, since the width of the bottom surface 110ai is set short, the click protrusion 124 can be sandwiched between the slope 110ah and a slope 110aj, thereby suppressing the looseness of the lever 110 in the power-on state.

Further, the details of sliding between the protruding portion 130b of the shoe lock cam base 130 and the shoe lock cam base sliding cam portion 110b will be described. When the transmitter 100 is in the unlocked state, a plurality of the protruding portions 130b of the shoe lock cam base 130 are respectively located in a recessed portion 110ba of the shoe lock cam base sliding cam portion 110b corresponding to the protruding portion 130b. After that, when the lever 110 rotates in the lock direction, each protruding portion 130b moves on a slope 110bb and reaches a convex portion 110bc, and at this time, the transmitter 100 shifts to the locked state. Moreover, even in the case that the lever 110 further rotates in the lock direction and the transmitter 100 shifts from the power-off state to the power-on state, the protruding portion 130b only moves on the convex portion 110bc. At this time, since the protruding portion 130b does not move in the Y direction, the shoe lock cam base 130 also does not move in the Y direction.

Figure 8C:
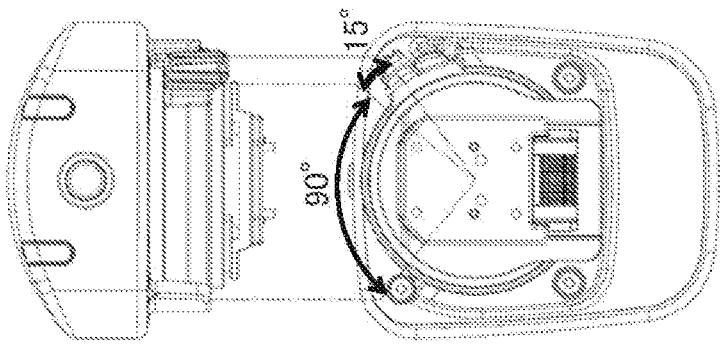
FIGS. 8A, 8B and 8C are views for explaining the movement of the lever when the transmitter shifts from an unlocked state to a power-on state via a locked state (a power-off state).
Figure 8B:
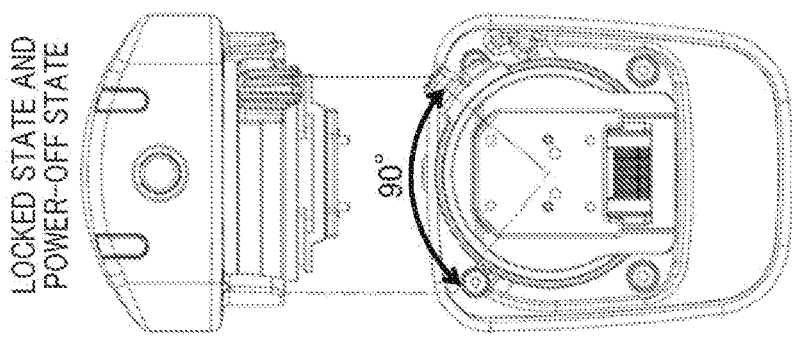
Figure 8A:
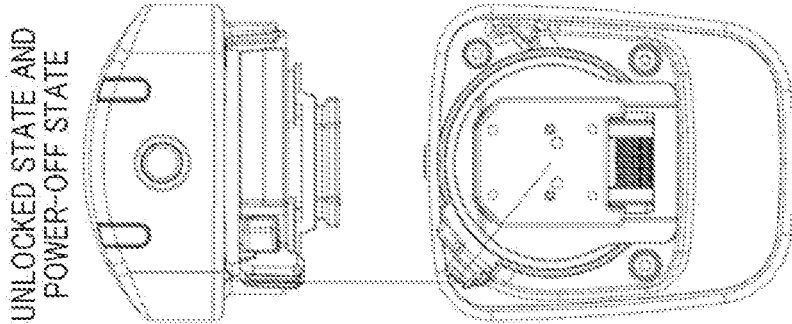

FIGS. 8A, 8B and 8C are views for explaining the movement of the lever 110 when the transmitter 100 shifts from the unlocked state to the power-on state via the locked state (the power-off state). FIG. 8A shows a case that the lever 110 is located at the unlock position, FIG. 8B shows a case that the lever 110 has reached the lock position, and FIG. 8C shows a case that the lever 110 has reached the power-on position.

In the case that the lever 110 is located at the unlock position (FIG. 8A), since the lock pins 111 are housed in the inside of the plate 107, does not pop out, and does not fit into the hole portion of the accessory shoe, it is possible to detach the transmitter 100 from the camera.

Further, when the lever 110 is rotated by 90° in the lock direction from the unlock position, the lever 110 reaches the lock position (FIG. 8B). At this time, although the power of the transmitter 100 is in the off state, the lock pins 111 pop out, and fit into the hole portion of the accessory shoe. As a result, the transmitter 100 is fixed to the accessory shoe of the camera, and shifts to the locked state. Furthermore, even in the case that the lever 110 reaches the lock position, the power detecting protrusion 125 is on the way of climbing the slope 110ab of the power cam portion 110a, and has not reached the top surface 110ac. Therefore, the power detection is not performed, and the power of the transmitter 100 is maintained in the off state.

Furthermore, when the lever 110 is rotated by 15° in the lock direction from the lock position, the lever 110 reaches the power-on position (FIG. 8C). Also at this time, the lock pins 111 fit into the hole portion of the accessory shoe, and the locked state is maintained. On the other hand, the power detecting protrusion 125 finishes climbing the slope 110ab of the power cam portion 110a, and reaches the top surface 110ac. As a result, the power detection is performed, and the power of the transmitter 100 shifts to the on state. Further, when the power is detected and the power shifts to the on state, the transmitter 100 notifies the camera that the power has shifted to the on state, and further the MPU 116a is activated.

Further, when the lever 110 is rotated by 15° in the unlock direction from the power-on position, the lever 110 reaches the lock position (FIG. 8B). At this time, although the transmitter 100 shifts to the power-off state, the locked state is maintained. That is, by slightly rotating the lever 110 in the unlock direction, it is possible to shift to the power-off state without detaching the transmitter 100 from the camera.

Furthermore, when the lever 110 is rotated by 90° in the unlock direction from the lock position, the lever 110 reaches the unlock position (FIG. 8A). However, as described above, when the lever 110 is located at the lock position, the lock wall surface 103bc of the lock release button sliding cam portion 103b becomes the obstacle, and the button protruding portion 112a does not easily return to the arc wall surface 103bb. Then, in order for the button protruding portion 112a to get over the lock wall surface 103bc, the operator needs to push the lock release button 112 so as to move the button protruding portion 112a toward the rotation center. That is, a thing that the lever 110 rotates from the power-on position through the power-off position to the unlock position without stopping has not happened. This thing makes it possible to prevent that the transmitter 100 is accidentally detached from the camera when making the power of the transmitter 100 become the off state. As a result, it is possible to suppress such a phenomenon that during setting information is being written into an EEPROM 141, the transmitter 100 is detached from a camera 300 and a power ACC_POW supplied from the camera 300 is turned off, and it is possible to suppress such a phenomenon that the setting information is destroyed.

Furthermore, as described above, when the lever 110 has reached the power-on position, since the power supply cover portion 103a covers at least a part of the lock release button 112, the operation of the lock release button 112 is blocked. As a result, it is possible to prevent such a phenomenon that the lock release button 112 is accidentally pressed down at the power-on position and then the lever 110 becomes capable of moving from the power-on position to the unlock position.

Further, in the transmitter 100, when the lever 110 is rotated from the power-on position to the unlock position, the lever 110 always passes through the power-off position. This makes it possible to prevent that the transmitter 100 is detached from the camera while the power of the transmitter 100 remains the on state.

Figure 9:
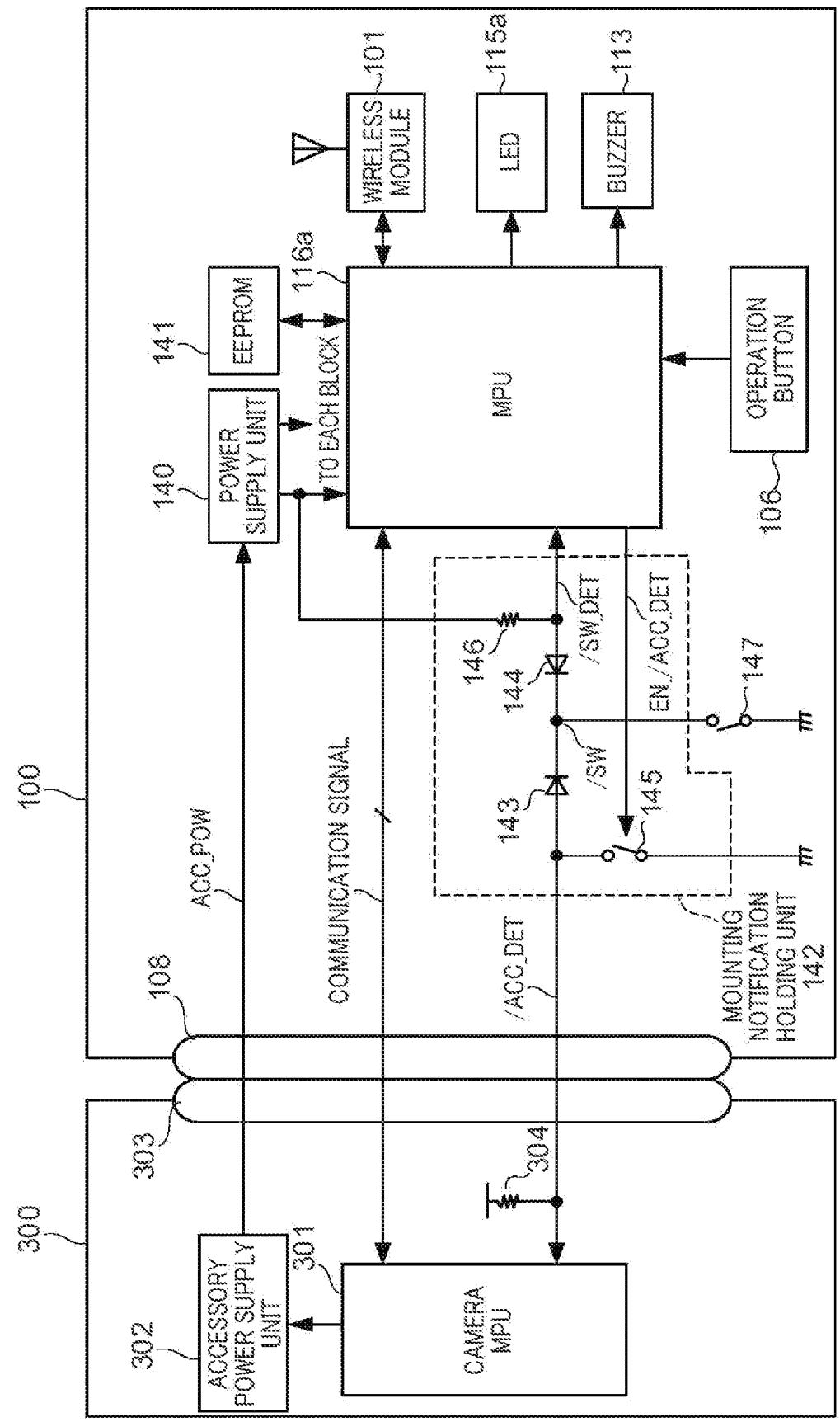
FIG. 9 is a block diagram that shows an electrical configuration of the transmitter of FIGS. 1A and 1B and a camera.

FIG. 9 is a block diagram that shows an electrical configuration of the transmitter 100 of FIGS. 1A and 1B and the camera. As shown in FIG. 9, the camera 300 has a camera MPU 301, an accessory power supply unit 302, an accessory shoe 303, and a pull-up resistor element 304. The transmitter 100 is attached to the accessory shoe 303 by the contact plug 108, and the camera 300 supplies the power to the transmitter 100 from the accessory power supply unit 302. The camera MPU 301 controls each configuration element of the camera 300. A signal/ACC_DET, which is an accessory mounting notification signal transmitted from the transmitter 100 to the camera 300, is pulled up by the pull-up resistor element 304 and changes to a high level when a transmission line that transmits the signal/ACC_DET is disconnected from the ground (GND). When the transmission line is grounded and the signal/ACC_DET is pulled down and changes to a low level, the camera MPU 301 detects that an accessory such as the transmitter 100 is attached. In response to the detection of the change of the signal/ACC_DET to the low level, the accessory power supply unit 302 supplies the accessory power ACC_POW to the transmitter 100.

The transmitter 100 has the MPU 116a, a power supply unit 140 (a power receiving unit), the EEPROM 141, and a mounting notification holding unit 142. The MPU 116a controls each configuration element of the transmitter 100. Further, the MPU 116a transmits and receives various kinds of information to and from the camera MPU 301 via the contact plug 108 and the accessory shoe 303. The power supply unit 140 generates the power to be supplied to each configuration element of the transmitter 100 from the power ACC_POW supplied from the camera 300. The EEPROM 141 stores various setting values for controlling the transmitter 100 and the setting information transmitted from the camera 300.

The mounting notification holding unit 142 is configured by a diode 143, a diode 144, a switching element 145, and a pull-up resistor element 146. As will be described later, the mounting notification holding unit 142 has a function of holding a state (the level) of the signal/ACC_DET to be transmitted to the camera 300 for a predetermined period of time. Moreover, a configuration of the mounting notification holding unit 142 is not limited to the configuration shown in FIG. 9 as long as the function of holding the state of the signal/ACC_DET can be realized. The diode 144 is a rectifying diode that prevents an electric current from flowing from the camera 300 into the MPU 116a when the accessory power ACC_POW is turned off. When an accessory mounting notification signal EN/ACC_DET used in the transmitter 100 reaches a high level, the switching element 145 is turned on. When the switching element 145 is turned on, the transmission line of the signal/ACC_DET transmitted to the camera 300 is grounded, and the signal/ACC_DET is pulled down and changes to a low level.

A switch 147 (a state detecting unit, a lock detecting unit) is a schematic representation of the power switch, which switches in response to a usage state of the transmitter 100 by the operator and is configured by the shoe FPC 118, the power detecting protrusion 125, and the power detecting rubber member 126. In the case that the switch 147 is turned off, a power switch signal/SW_DET reaches a high level by the pull-up resistor element 146. The MPU 116a detects that the switch 147 is turned off base on a fact that the power switch signal/SW_DET becomes the high level, and shifts the transmitter 100 to the power-off state. On the other hand, in the case that the switch 147 is turned on, the power switch signal/SW_DET becomes a low level, the MPU 116a detects that the switch 147 is turned on, and shifts the transmitter 100 to the power-on state.

In the transmitter 100, if the power ACC_POW is turned off (i.e., if the power ACC_POW is no longer supplied) during the setting information transmitted from the camera 300 is being written from the MPU 116a into the EEPROM 141, there is the risk that the setting information will be destroyed. Further, even in the case that the writing operation of the MPU 116a has been completed, in some cases, the writing operation of the inside of the EEPROM 141 has not been completed. In this case, when the power ACC_POW is turned off during the writing operation of the inside of the EEPROM 141, there is also a risk that the setting information will be destroyed. Correspondingly, in the present embodiment, even in the case that the transmitter 100 shifts from the power-on state to the power-off state, it is possible to prevent the power ACC_POW from being turned off immediately.

Figure 10A:
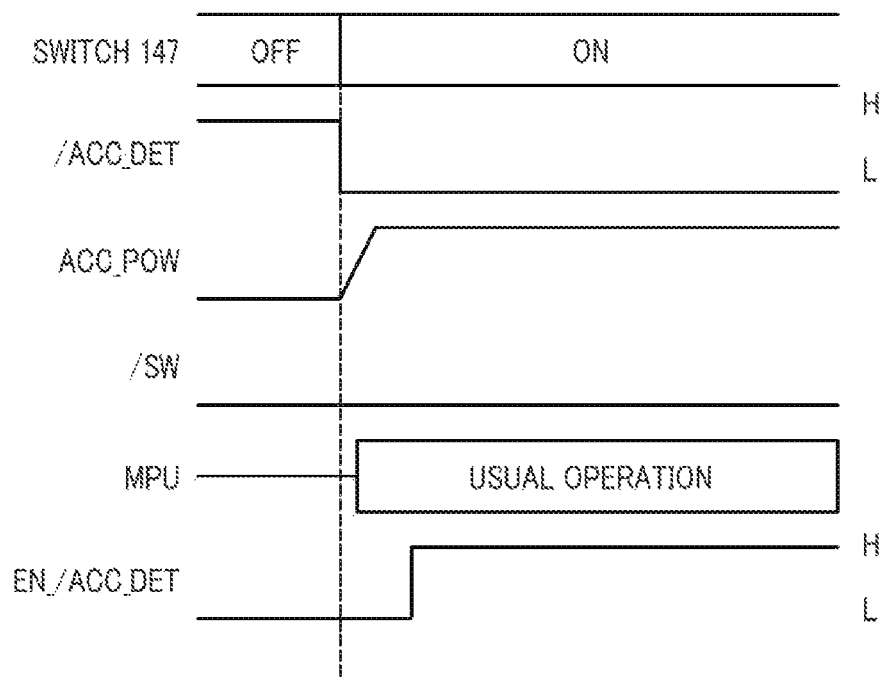
FIG. 10A is a sequence diagram that shows the operation of each configuration element when the transmitter shifts to the power-on state.
Figure 10B:
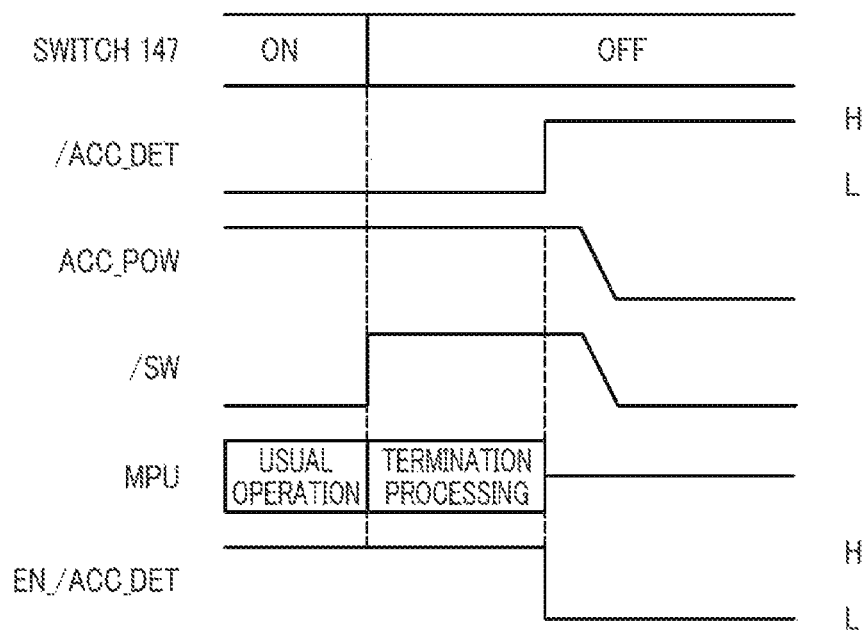
FIG. 10B is a sequence diagram that shows the operation of each configuration element when the transmitter shifts to the power-off state.

FIG. 10A is a sequence diagram that shows the operation of each configuration element when the transmitter 100 shifts to the power-on state, and FIG. 10B is a sequence diagram that shows the operation of each configuration element when the transmitter 100 shifts to the power-off state. FIG. 10A shows the case that the transmitter 100 shifts to the power-on state, and FIG. 10B shows the case that the transmitter 100 shifts to the power-off state.

At first, the operation of each configuration element when the transmitter 100 is attached to the camera 300 and shifts to the power-on state will be described. After the transmitter 100 is attached to the camera 300, when the lever 110 is rotated from the lock position (the power-off position) to the power-on position, the switch 147 is turned on, and the signal/ACC_DET changes from the high level (H) to the low level (L). When the signal/ACC_DET changes to the low level, the camera MPU 301 detects that the transmitter 100 has been attached to the camera 300, and controls the accessory power supply unit 302 to supply the accessory power ACC_POW to the transmitter 100. Further, when the power ACC_POW is supplied, the MPU 116a of the transmitter 100 is activated to start a usual operation. At this time, the MPU 116a changes the signal EN_/ACC_DET from the low level (L) to the high level (H), and turns on the switching element 145.

In the usual operation, communications with the camera 300 are executed, and in the present embodiment, since the communications with the camera 300 are executed in a state that the transmitter 100 is fixed to the accessory shoe 303 of the camera 300, poor contacting of the contact plug 108 is unlikely to occur. As a result, it is possible to reduce the occurrence of chattering of communication signals due to the poor contacting, and it is possible to avoid poor communication.

Next, the operation of each configuration element when the transmitter 100 shifts from the power-on state to the power-off state in a state that the transmitter 100 is still attached to the camera 300 will be described. When the lever 110 is rotated from the power-on position to the power-off position (the lock position), the switch 147 is turned off. However, even in the case that the switch 147 is turned off, since the signal EN_/ACC_DET is not affected, the signal EN/ACC_DET remains at the high level, and the switching element 145 also remains the turned-on state. Therefore, the signal/ACC_DET continues to be pulled down, and the low level is maintained. As a result, the camera MPU 301 continues to detect the attachment of the transmitter 100, and maintains the supply of the accessory power ACC_POW to the transmitter 100.

On the other hand, since the switch 147 is turned off, although the power switch signal/SW_DET reaches the high level by the pull-up resistor element 146, the diode 143 prevents the electric current from flowing from the power switch signal/SW_DET side into the signal/ACC_DET side. Therefore, the power switch signal/SW_DET remains at the high level even though the signal/ACC_DET is at the low level.

That is, in the present embodiment, the MPU 116a detects that the switch 147 is turned off, while the camera MPU 301 continues to detect the attachment of the transmitter 100. When the MPU 116a detects that the switch 147 is turned off, it executes a termination processing of the transmitter 100. The termination processing executed here corresponds to, for example, stopping a wireless control, turning off the LED, and writing the setting information into the EEPROM 141.

After that, when the termination processing is completed, the MPU 116a changes the signal EN_/ACC_DET to the low level, and turns off the switching element 145. At this time, the signal/ACC_DET is no longer pulled down, is pulled up by the pull-up resistor element 304 and changes to the high level, and the signal/ACC_DET becomes disabled as the accessory mounting notification signal. Upon detecting that the signal/ACC_DET changes to the high level, the camera MPU 301 judges that the transmitter 100 has been detached or that the transmitter 100 has shifted to the power-off state. Then, the camera MPU 301 controls the accessory power supply unit 302 to stop the supply of the accessory power ACC_POW to the transmitter 100.

According to the transmitter 100, even in the case that the lever 110 is rotated from the power-on position to the power-off position, the accessory mounting notification signal/ACC_DET does not immediately change to the high level, and the low level is maintained until the termination processing of the transmitter 100 is completed. As a result, it is possible to prevent the power ACC_POW supplied from the camera 300 from being turned off during the setting information is being written into the EEPROM 141, and thus it is possible to prevent the setting information from being destroyed.

Further, the configuration, which suppresses that the lever 110 rotates to the unlock position without stopping, is not limited to the present embodiment. For example, a method, which makes it difficult for the button protruding portion 112a to get caught in the operator's finger at the power-on position or the power-off position by adjusting a combination of a height of the lever 110, a convex amount of the lock release button 112, a spring force of the lock release spring 127, and the like, is also conceivable. However, since the present embodiment suppresses that the lever 110 rotates to the unlock position without stopping only by providing the power supply cover portion 103a, it is possible for the present embodiment to realize the configuration of suppressing that the lever 110 rotates to the unlock position without stopping at a lower cost than the complicated method described above. Further, since the configuration of the present embodiment is simple, it is also possible to improve the reliability.

Moreover, in the present embodiment, the configuration, in which switching between the power-on state and the power-off state and switching between the locked state and the unlocked state are executed only by the lever 110 that is one operation unit, has been described. However, if the supply of the power from the camera 300 is not stopped until the termination processing of the transmitter 100 is completed, the switching between the power-on state and the power-off state and the switching between the locked state and the unlocked state may be realized by respective operation units. Further, the switch 147 may be configured by an independent power switch. Moreover, the switch 147 may be a member that detects a state that the lock pins 111 popped out, that is, that detects that the transmitter 100 is locked on the accessory shoe 303. Further, the sequence shown in FIG. 10A may be executed for the first time when both shifting to the power-on state and shifting to the locked state are detected.

Further, in the present embodiment, the configuration, in which the switching between the locked state and the unlocked state of the accessory device and the switching between the power-on state and the power-off state are linked, has been described. However, the present invention may be applied to a configuration, in which the switching between the power-on state and the power-off state and an operation intended by the operator to use the accessory device are linked.

Next, an accessory device according to a second embodiment of the present invention will be described. The configurations, operations, and effects of the second embodiment are basically the same as those of the first embodiment described above, and the second embodiment differs from the first embodiment in that the lock release button 112 moves toward the rotation center of the lever 110 when shifting the power-off state to the power-on state. Therefore, the descriptions of the duplicated configurations, operations, and effects will be omitted, and the different configurations, operations, and effects will be described below.

Figure 11:
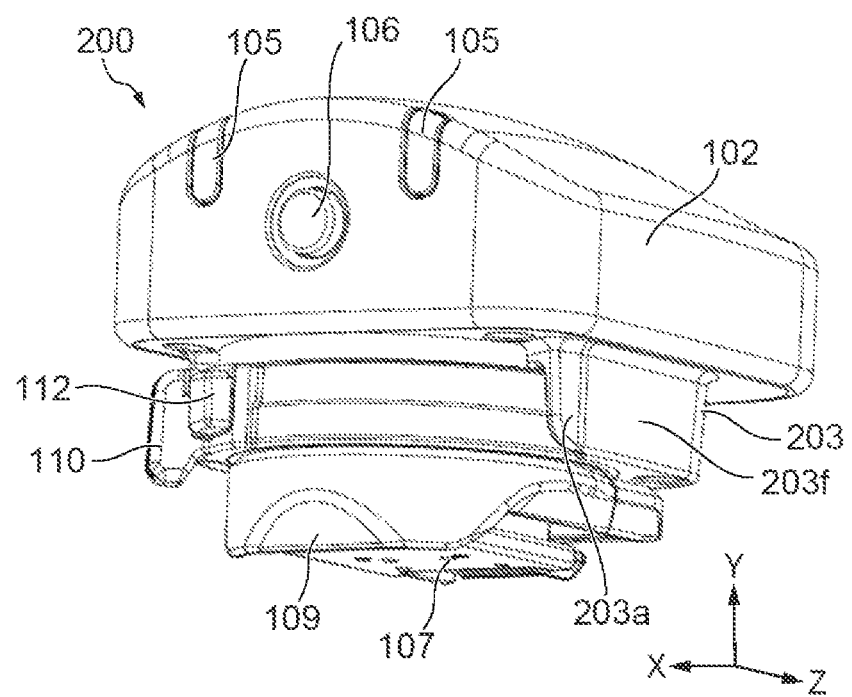
FIG. 11 is a view that shows the outside appearance of a transmitter as an accessory device according to a second embodiment of the present invention.
Figure 13A:
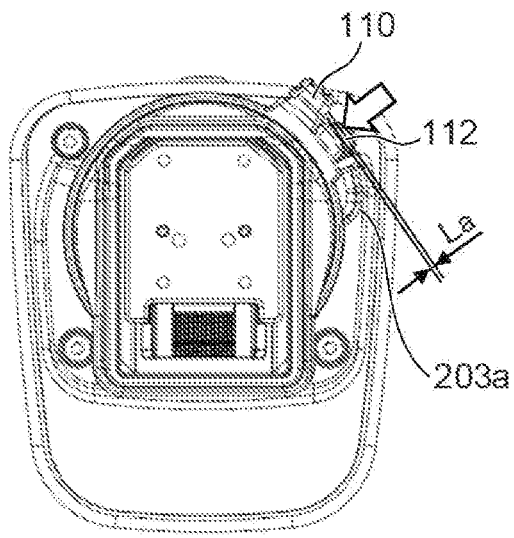
FIGS. 13A, 13B, 13C and 13D are views for explaining the movement of a lock release button when shifting from the power-off state to the power-on state.
Figure 13B:
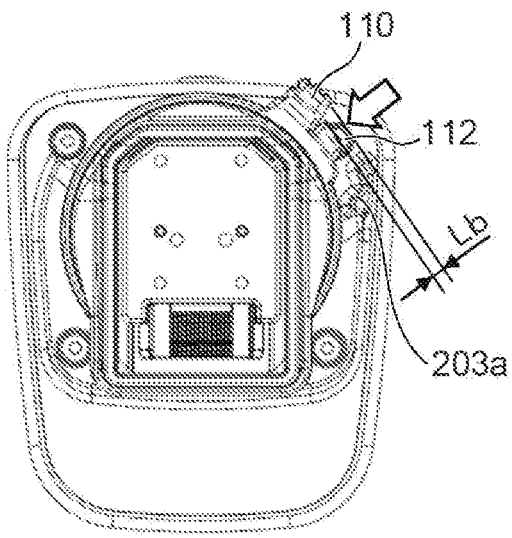
Figure 13C:
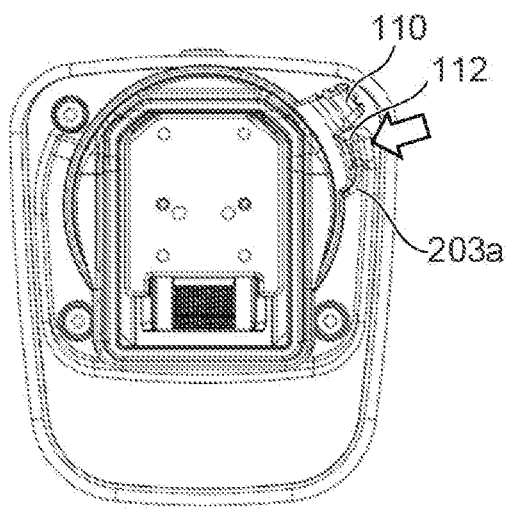
Figure 13D:
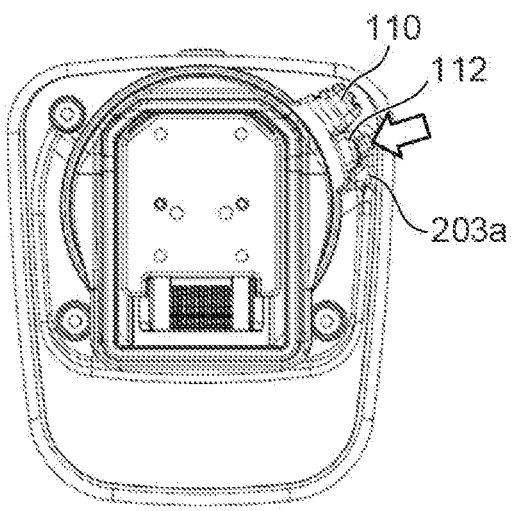
Figure 14A:
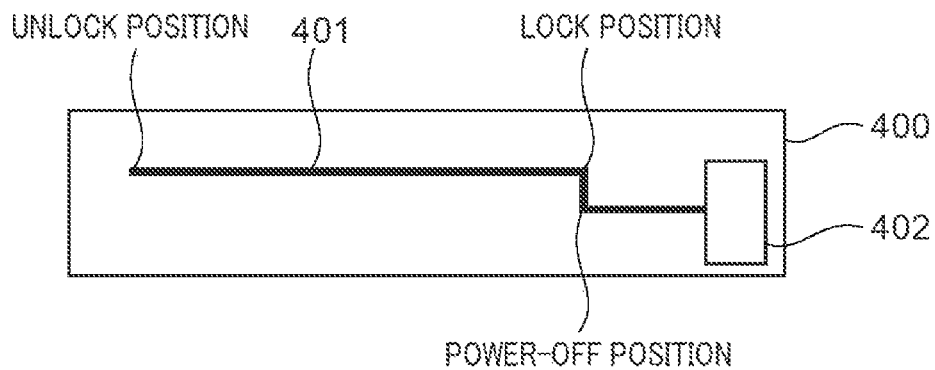
FIGS. 14A, 14B, 14C and 14D are process drawings for explaining an unlocking operation in the lock unit that moves the lever in a Y direction in the middle of rotating of the lever.
Figure 14B:
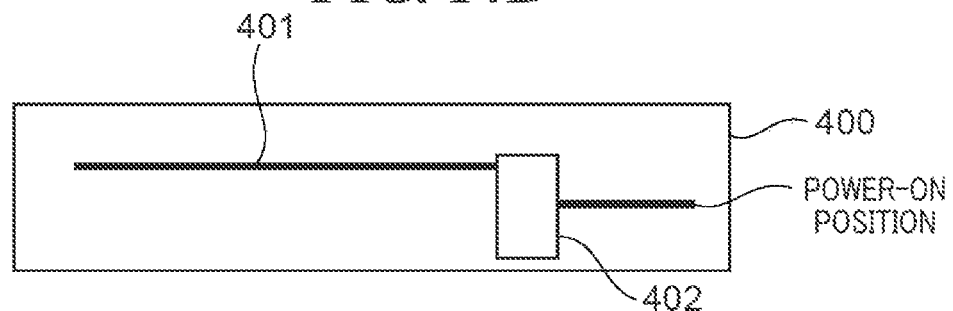
Figure 14C:
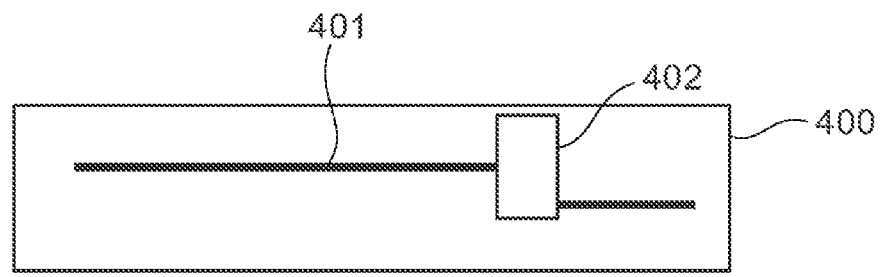
Figure 14D:
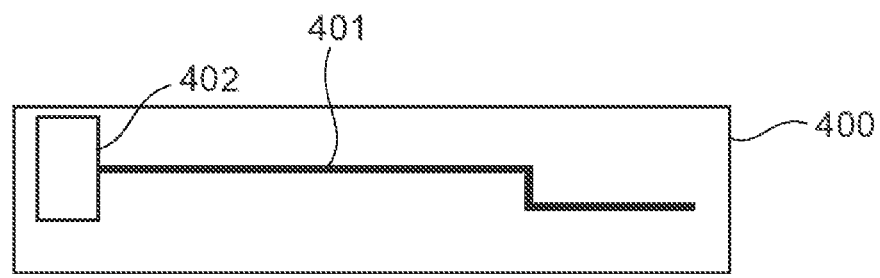

FIG. 11 is a view that shows the outside appearance of a transmitter 200 as the accessory device according to the second embodiment of the present invention. FIGS. 12A and 12B are views for explaining a lock release button sliding cam portion formed on a bottom cover in the second embodiment of the present invention. FIG. 12A shows a lock release button sliding cam portion 203b of the second embodiment, and FIG. 12B shows the lock release button sliding cam portion 103b of the first embodiment. FIGS. 13A, 13B, 13C and 13D are views for explaining the movement of the lock release button 112 when shifting from the power-off state to the power-on state. FIG. 13A shows the lock release button 112 in the power-off state of the second embodiment, and FIG. 13B shows the lock release button 112 in the power-off state of the first embodiment. Further, FIG. 13C shows the lock release button 112 in the power-on state of the second embodiment, and FIG. 13D shows the lock release button 112 in the power-on state of the first embodiment.

In the transmitter 200, a bottom cover 203 has the lock release button sliding cam portion 203b. As with the first embodiment, when the lever 110 is rotated to the power-on position in the lock direction, a power supply cover portion 203a covers at least a part of the lock release button 112, and hides it from the operator's finger or the like.

The lock release button sliding cam portion 203b is a cam structure that slides with the button protruding portion 112a of the lock release button 112 when the lever 110 rotates. Here, with reference to FIG. 12A, the movement of the lock release button 112 (the button protruding portion 112a) that is restricted by the lock release button sliding cam portion 203b when the lever 110 rotates will be described. Further, with respect to the lock direction, a cam slope 203ba, an arc wall surface 203bb, a lock wall surface 203bc, a wall surface 203bd, a cam slope 203be, and an arc wall surface 203bf, which slide with the button protruding portion 112a, are formed on the lock release button sliding cam portion 203b in this order.

At first, when the lever 110 is operated to start rotating from the unlock position to the lock position, the button protruding portion 112a slides on the cam slope 203ba, and the click feeling is generated when the button protruding portion 112a moves toward the rotation center and gets over the cam slope 203ba. Next, along with the rotation toward the lock position of the lever 110, the button protruding portion 112a slides while being pressed against the arc wall surface 203bb by the lock release spring 127.

After that, when the button protruding portion 112a gets over the lock wall surface 203bc that formed corresponding to the lock position, the button protruding portion 112a is pressed against the wall surface 203bd by the lock release spring 127. At this time, the transmitter 200 shifts to the locked state. Since the wall surface 203bd is formed at outside than the arc wall surface 203bb with respect to the energizing direction of the lock release spring 127, the lock wall surface 203bc becomes the obstacle, and the button protruding portion 112a, which is pressed against the wall surface 203bd, does not easily return to the arc wall surface 203bb. The movement of the button protruding portion 112a from the cam slope 203ba to the wall surface 203bd is the same as the movement of the button protruding portion 112a of the first embodiment from the cam slope 103ba to the wall surface 103bd.

Further, along with the rotation toward the lock direction of the lever 110, the button protruding portion 112a slides on the cam slope 203be, and the button protruding portion 112a moves toward the rotation center and gets over the cam slope 203be. Next, along with the rotation toward the power-on position of the lever 110, the button protruding portion 112a slides while being pressed against the arc wall surface 203bf by the lock release spring 127.

That is, in the second embodiment, unlike the first embodiment, when the lever 110 rotates from the power-off position to the power-on position, the lock release button 112 moves toward the rotation center. Therefore, at the power-on position, the lock release button 112 is closer to the rotation center as compared with the first embodiment. Then, when the lever 110 has reached the power-on position, at least a part of the lock release button 112 is covered by the power supply cover portion 203a.

As described above, at the power-on position, the lock release button 112 is closer to the rotation center as compared with the first embodiment. Therefore, it is possible to form the power supply cover portion 203a (FIGS. 13A and 13C) that covers the lock release button 112 closer to the rotation center as compared with the power supply cover portion 103a (FIGS. 13B and 13D) of the first embodiment. As a result, it is possible to reduce a recessed amount La (FIG. 13A) of the lock release button 112 at the power-off position with respect to the power supply cover portion 203a. Specifically, it is possible to make the recessed amount La smaller than a recessed amount Lb (FIG. 13B) of the lock release button 112 at the power-off position with respect to the power supply cover portion 103a of the first embodiment. As a result, when pushing the lock release button 112 toward an arrow direction of the drawing in order to release locking of the lever 110 at the power-off position, the operator's finger can easily reach the lock release button 112 as compared with the first embodiment. Thereby, it is possible to improve the operability of the lock release button 112.

Further, as described above, since the power supply cover portion 203a can be formed close to the rotation center, it is possible to reduce a protrusion amount of the power supply cover portion 203a from a wall portion 203f provided on the bottom cover 203, and it is possible to improve the appearance.

Although the preferred embodiments of the present invention have been described above, the present invention is not limited to the above-described embodiments, and various modifications and changes can be made within the scope of the gist thereof.

For example, the accessory device, to which the present invention is applied, is not limited to the transmitter, and may be a strobe device, a microphone, an adapter, or the like, to which the power is supplied from the camera 300. Further, the device, to which the present invention is applied, is not limited to the accessory device. For example, the present invention can be applied to any another electronic apparatus that is attached to one electronic apparatus having a power source and receives supply of the power from the one electronic apparatus.

Further, the transmitter 100, to which the present invention is applied, causes the camera 300 to continue to supply the accessory power supply ACC_POW by keeping the accessory mounting notification signal/ACC_DET at the low level until the termination processing is completed. However, the signal/ACC_DET may change to the high level as soon as the transmitter 100 has shifted to the power-off state. In this case, the camera 300 may be configured to supply the power ACC_POW for a period of time corresponding to a period of time from the signal/ACC_DET changing to the high level to the completion of the termination processing.

Further, in order to prevent the operator from moving the lever 110 to the unlock position before the termination processing of the transmitter 100 is completed, the operator's attention may be drawn. For example, before the termination processing of the transmitter 100 is completed, a display unit (not shown) of the transmitter 100 may perform a warning display or the buzzer 113 may sound a warning sound.

Further, in the lock unit 120 of the transmitter 100 described above, although the lock position of the lever 110 and the power-off position of the lever 110 accord, the lock position and the power-off position do not have to accord. For example, when the lever 110 is rotated in the unlock direction, the power-on position, the power-off position, the lock position, and the unlock position may be set in this order.

Further, in the transmitter 100 described above, although the lever 110 does not move in the Y direction (a vertical direction), it may be configured to move the lever 110 in the Y direction in the middle of rotating of the lever 110. FIGS. 14A, 14B, 14C and 14D are process drawings for explaining an unlocking operation in a lock unit 400 that moves the lever 110 in the Y direction in the middle of rotating of the lever 110. Here, the lock unit 400 is in an approximately cylindrical shape, and has a lever 402 that moves in a circumferential direction on a side surface, and a guide groove 401 that guides the lever 402. The guide groove 401 is formed along the circumferential direction of the lock unit 400, and bends in the Y direction (the vertical direction) at one place of the guide groove 401. The power-on position, the power-off position, the lock position, and the unlock position are set in the guide groove 401 along the circumferential direction, and the power-off position and the lock position are set at a lower end and an upper end of the guide groove 401 that bends in the Y direction, respectively.

A case that the lever 110 is rotated from the power-on position to the unlock position in the lock unit 400 will be described. At first, when the lever 110 reaches the power-off position (FIG. 14B) from the power-on position (FIG. 14A), since the guide groove 401 is bent in the Y direction, the lever 110 temporarily stops. Next, when the lever 110 is moved in the Y direction to reach the lock position (FIG. 14C), the lever 110 can rotate again. After that, the lever 110 is rotated to reach the unlock position.

In this case as well, since the lever 110 temporarily stops at the power-off position, the thing that the lever 110 rotates from the power-on position through the power-off position to the unlock position without stopping has not happened. This thing makes it possible to prevent that the transmitter 100 is accidentally detached from the camera when making the power of the transmitter 100 become the off state.

In addition, it is also possible to perform locking the accessory device and powering on the accessory device by using separate operation members. In this case, when performing the powering on the accessory device by using the power switch in a state that a lever for locking is moved to the lock position, a restricting member, which prevents the lock release button 112 from being pressed, is moved to make it difficult to release the locking the accessory device. Further, when performing powering off the accessory device by using the power switch, the restricting member may be moved to make it easy to release the locking the accessory device. The movement of the restricting member may be mechanically interlocked in response to a state of the power switch, or may be electrically controlled by the MPU by detecting the state of the power switch. Further, a method, which prevents the lock release button 112 from being pressed by the restricting member, is not particularly limited, for example, the restricting member is moved to the front of the lock release button 112, and for example, by covering the lock release button 112 with the restricting member, it is possible to make it difficult for the user to press the lock release button 112. Alternatively, the restricting member is moved to a position that restricts the movement of the lock release button 112, for example, by engaging the restricting member with the lock release button 112, it becomes possible that the lock release button 112 does not move even in the case that the user presses the lock release button 112. Moreover, the accessory device is capable of being attached to or detached from an image pickup apparatus. Further, the accessory device works during photographing of the image pickup apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-195525, filed Nov. 25, 2020, which is hereby incorporated by reference herein in its entirety.

What is claimed is:

1. An accessory device capable of being attached to or detached from an electronic apparatus, comprising:
 an operation member;
 a lock mechanism configured to perform a locking operation to lock the accessory device and the electronic apparatus in response to an operation of the operation member;
 a movement restriction release mechanism configured to release a restriction on a movement of the operation member; and
 an operation restricting member configured to restrict an operation of the movement restriction release mechanism, and
 wherein the operation restricting member makes it more difficult to perform the operation of the movement restriction release mechanism when a power of the accessory device is in an on state than when the power of the accessory device is in an off state.

2. The accessory device according to claim 1,
 wherein switching between the on state of the power and the off state of the power, and the locking operation of the lock mechanism can be performed by the operation of the operation member.

3. The accessory device according to claim 1,
 wherein when the operation member is operated in a predetermined direction, after the lock mechanism performs the locking operation, switching from the off state of the power to the on state of the power is performed.

4. The accessory device according to claim 3,
 wherein in a case that the power is in the on state, when the operation member is operated in a direction opposite to the predetermined direction, after switching from the on state of the power to the off state of the power is performed, the lock mechanism performs an unlocking operation to detach the accessory device from the electronic apparatus.

5. The accessory device according to claim 1,
 wherein the operation restricting member includes a cover portion, and in a case that the power is in the on state, the cover portion covers at least a part of the movement restriction release mechanism.

6. The accessory device according to claim 1,
 wherein the accessory device is capable of being attached to or detached from an image pickup apparatus.

7. The accessory device according to claim 6,
 wherein the accessory device works during photographing of the image pickup apparatus.

8. An accessory device capable of being attached to or detached from an electronic apparatus, comprising:
 a mounting portion that is mounted on the electronic apparatus;
 a state detecting unit configured to detect a usage state of the accessory device by an operator;
 a power receiving unit configured to receive supplying of a power from the electronic apparatus; and
 a mounting notification unit configured to notify the electronic apparatus of a mounting notification when detecting using of the accessory device by the operator, and
 wherein when the mounting notification unit detects non-use of the accessory device by the operator, the mounting notification unit holds notifying of the mounting notification to the electronic apparatus for a predetermined period of time, and then disables the notifying of the mounting notification.

9. The accessory device according to claim 8,
 wherein the state detecting unit comprises at least one of a switching portion that is used for performing switching between an on state of a power of the accessory device and an off state of the power of the accessory device, and a lock detecting unit configured to detect whether or not the mounting portion is locked so that it cannot be detached from the electronic apparatus.

10. The accessory device according to claim 8, further comprising
 a controller configured to control each configuration element,
 wherein when the mounting notification unit detects the non-use of the accessory device by the operator, the mounting notification unit holds the notifying of the mounting notification to the electronic apparatus for the predetermined period of time, while notifying the controller of the non-use of the accessory device, and
 wherein when the non-use of the accessory device is notified, the controller executes a termination processing of the accessory device, and when the termination processing is completed, the controller controls the mounting notification unit so as to disable the notifying of the mounting notification.

11. The accessory device according to claim 8,
 wherein the accessory device is capable of being attached to or detached from an image pickup apparatus.

12. The accessory device according to claim 11,
 wherein the accessory device works during photographing of the image pickup apparatus.

* * * * *